United States Patent
Chan et al.

(10) Patent No.: US 7,209,305 B2
(45) Date of Patent: Apr. 24, 2007

(54) METHOD FOR DETERMINING UNIQUE WRITE INHIBIT THRESHOLDS FOR INDIVIDUAL HEADS FOR MAXIMIZING FILE SERVO PERFORMANCE

(75) Inventors: Hin-Ching Hubert Chan, San Jose, CA (US); Joseph Emanuel Silva, Hollister, CA (US); Thomas Stanley, Gilroy, CA (US); Yue Ming Tang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 11/031,291

(22) Filed: Jan. 6, 2005

(65) Prior Publication Data

US 2006/0146433 A1    Jul. 6, 2006

(51) Int. Cl.
   *G11B 27/36* (2006.01)
(52) U.S. Cl. ...................................................... 360/31
(58) Field of Classification Search .................. 360/31, 360/60, 75, 78.04; 307/119
   See application file for complete search history.

(56) References Cited

U.S. PATENT DOCUMENTS

| | | | |
|---|---|---|---|
| 4,513,333 A | | 4/1985 | Young et al. |
| 5,270,880 A | | 12/1993 | Ottesen et al. |
| 5,570,244 A | | 10/1996 | Wiselogel |
| 5,696,645 A | * | 12/1997 | Laughlin ..................... 360/75 |
| 5,721,457 A | * | 2/1998 | Sri-Jayantha et al. ....... 307/119 |
| 5,790,333 A | | 8/1998 | Kimura et al. |
| 5,995,305 A | | 11/1999 | McNeil et al. |
| 6,061,197 A | * | 5/2000 | Wiselogel ..................... 360/60 |
| 6,061,805 A | | 5/2000 | Suzuki et al. |
| 6,084,733 A | | 7/2000 | Ohzeki et al. |
| 6,101,053 A | | 8/2000 | Takahashi |
| 6,111,714 A | * | 8/2000 | Ueda et al. .................... 360/60 |
| 6,215,608 B1 | * | 4/2001 | Serrano et al. ............... 360/60 |
| 6,384,599 B1 | | 5/2002 | Chan et al. |
| 6,469,855 B1 | | 10/2002 | Lamberts et al. |
| 6,476,992 B1 | | 11/2002 | Shimatani |
| 6,496,315 B1 | | 12/2002 | Ueda et al. |
| 6,657,804 B1 | | 12/2003 | Tomiyama et al. |
| 6,657,805 B2 | * | 12/2003 | Nishida et al. ............... 360/60 |
| 6,754,021 B2 | * | 6/2004 | Kisaka et al. ................. 360/60 |
| 6,791,785 B1 | * | 9/2004 | Messenger et al. ...... 360/78.04 |
| 2004/0090699 A1 | | 5/2004 | Yang et al. |
| 2004/0125497 A1 | | 7/2004 | Schmidt |
| 2005/0152058 A1 | * | 7/2005 | Schmidt ..................... 360/60 |

FOREIGN PATENT DOCUMENTS

| | | |
|---|---|---|
| JP | 6084149 | 3/1994 |
| JP | 2002032971 | 1/2002 |
| JP | 2002092803 | 3/2002 |

OTHER PUBLICATIONS

"Adaptive Write-Inhibit Architecture" IBM TDB, May 1997, pp. 125ff.

* cited by examiner

*Primary Examiner*—Fred F. Tzeng

(57) ABSTRACT

A method for determining a write inhibit threshold value for at least one head of a file during the file manufacturing process is disclosed. The method includes qualifying a test track for use in the determining of the write inhibit threshold value. The method further includes performing a write inhibit threshold determination process to obtain the write inhibit threshold value and then storing the write inhibit threshold value for use with the at least one head of the file.

20 Claims, 12 Drawing Sheets

METHOD FOR DETERMINING UNIQUE WRITE INHIBIT THRESHOLDS FOR INDIVIDUAL HEADS FOR MAXIMIZING FILE SERVO PERFORMANCE

TECHNICAL FIELD

Embodiments of the present invention relate to the field of hard disk drive heads, and more particularly to a method for determining unique write inhibit thresholds for individual heads in a file in order to maximize overall file servo performance.

BACKGROUND ART

In a hard disk drive (HDD), herein also referred to as a file, data tracks are initially defined for the disks by the servo using a process called servo track writing (STW). Servo control is the precise positioning of the heads with respect to the data tracks in order to minimize whatever external disturbance, e.g., repeatable run-out (RRO), non-repeatable run-out (NRRO), misregistration, shock, vibration, etc., that might occur. Designers strive to minimize the impact of these disturbances. When the head moves off-track, they try to bring it back as soon as possible. However, if it gets too far off-track, there is a danger of writing over data on an adjacent track and destroying or erasing the existing data. Therefore, there is a value defined that is called the write inhibit threshold (WIT) value.

The write inhibit threshold value has an effect of limiting overall servo performance. The write inhibit threshold value is a number that is typically represented in servo units or as a percentage of track pitch. It is the amount of off-track a head is allowed to go during a writing operation that is deemed safe. That is to say, it is the amount that is determined to be allowed before damage could occur to the data on neighboring tracks. The write inhibit threshold value is like a safety valve which only exists to prevent the head from writing an unsafe distance off-track.

The writing off-track toward an adjacent (from track center) is sometimes referred to as a "squeeze" effect. Heads can have very wide distributions in their ability to handle squeeze effects. Some heads can tolerate more adjacent track squeezing from the writing process before errors are created on adjacent tracks. Other heads are a lot more sensitive to the squeeze and adjacent track errors can be created with a small squeeze effect. While the write inhibit threshold value is a needed requirement for data protection from off-track writing, it can impact file servo performance. The value used for the write inhibit threshold value is typically based on the results from the worst performing head in the population of heads that is to be used in a file product. That value is generally tighter than is necessary for the general population of heads.

Prior Art FIGS. 1A–1C are illustrations of data tracks showing variations in heads for writing data to the data tracks and the impact of the variations on write inhibit threshold values. Prior Art FIG. 1A shows a nominal sized head 105a residing above data track 110 that has a track mid-point defined by dotted line 120. Left adjacent data track 130 and right adjacent data track 140 are the tracks that would be susceptible to data errors or erasure should head 105a write too far off of track center 120. It is, however, possible that head 105a might be able to write off-track by an amount indicated by the length of arrow 160 toward left adjacent data track 130, or by an amount indicated by the length of arrow 150 toward right adjacent data track 140 without impacting either track.

Referring to Prior Art FIG. 1B, head 105b is a larger head than 105a of FIG. 1A. If head 105b were to write off-track by the amount indicated by the length of arrow 150 or the length of arrow 160, it might impact the data on left adjacent data track 130 or right adjacent data track 140.

In Prior Art FIG. 1C, a head 105c is shown that is smaller than either head 105a or 105b. Head 105c might be able to write off-track by an amount that is greater than either amount 150 or amount 160 without impacting either adjacent data track 130 or adjacent data track 140.

In the examples shown in FIGS. 1A, 1B and 1C, if heads 105a, 105b and 105c were to constitute the entire population of heads to be used in a file product, the write inhibit threshold value would be determined based on head 105b. Although size was used to exemplify differences in heads that might affect off-track performance, it is only one of several aspects of heads that can affect off-track performance. However, it can be seen from this example that, by basing the write inhibit threshold value on the off-track performance of head 105b, the write inhibit threshold value is tighter than it needs to be for heads 105a and 105c. The tighter number impacts the file's servo and mechanical systems since it generally takes longer to certify a tighter write inhibit threshold value before writing can take place. It also means that a writing process may be aborted sooner than needed. Also, revisions may be burned unnecessarily and/or unnecessary retries may be required if, during the writing process, it is found that the write inhibit threshold value was exceeded before the completion of writing all the data to the disk. This can have the observed effect of taking longer to perform writing operations, which impacts file performance.

SUMMARY

Embodiments of the present invention include a method for determining a write inhibit threshold value for at least one head of a file during the file manufacturing process. The method includes qualifying a test track for use in the determining of the write inhibit threshold value. The method further includes performing a write inhibit threshold determination process to obtain the write inhibit threshold value and then storing the write inhibit threshold value for use with the at least one head of the file.

BRIEF DESCRIPTION OF THE DRAWINGS

Prior Art

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Figure 3:
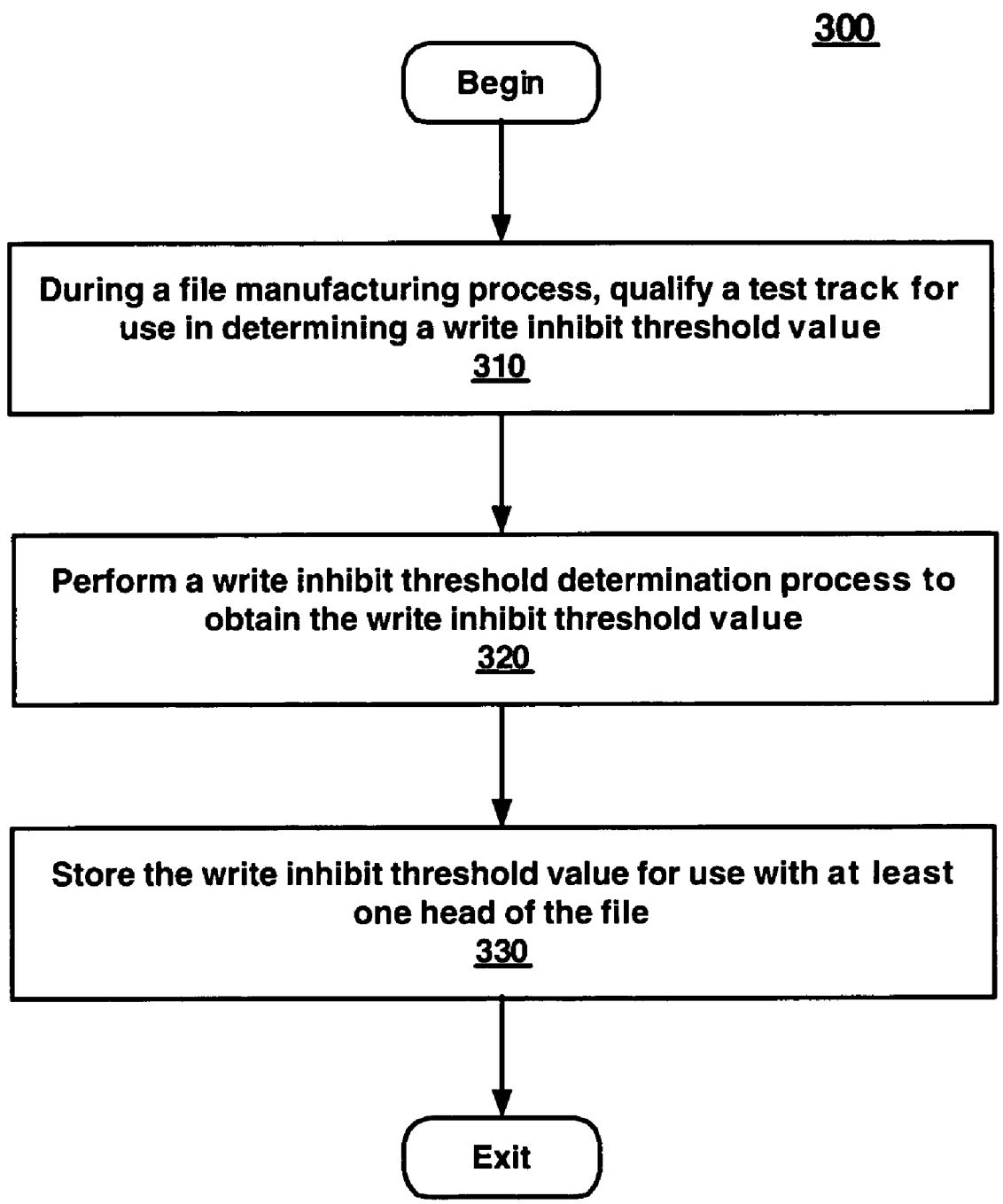
FIG. 3 is a flowchart of a method for determining a write inhibit threshold value for at least one head of a file during the file manufacturing process, in accordance with an embodiment of the present invention.

Certain portions of the detailed descriptions of embodiments of the invention, which follow, are presented in terms of processes and methods (e.g., method 300 of FIG. 3). Although specific steps are disclosed herein describing the operations of these processes and methods, such steps are exemplary. That is, embodiments of the present invention are well suited to performing various other steps or variations of the steps recited in the processes and methods herein.

Embodiments of the present invention include a method by which unique write inhibit threshold values can be obtained on a per-head basis during the manufacture of a hard disk file in order to maximize overall file servo performance. The method takes into account existing file architecture, the ability to set write inhibit threshold values through the file's microcode, and the ability to measure soft error rate capability as a function of an adjacent track's off-track writing, using either random seek off-track writing or design-specified off-track writing for each individual head during the manufacturing process.

Embodiments of the present invention further include methods by which the amount of adjacent "squeeze-track" handling capability is measured at a point where the soft error rate (SER) on a track is deemed too poor or where hard errors are created. Thus, the write threshold can be uniquely derived for a head as a value that allows for a safety margin to be applied to the value just before that which resulted in the unacceptable SER. The average of the unique write inhibit threshold values would be expected to result in allowing a larger percentage of the squeeze-track pitch handling capability than that of the worst-case head. Thus, overall file servo performance could be expected to improve since the heads in the file are longer limited by the write inhibit threshold value of the worst-case head. Each head can now have its own unique write inhibit threshold value as a function of its own capability to handle a percentage of off-track "squeeze".

Figure 1A:
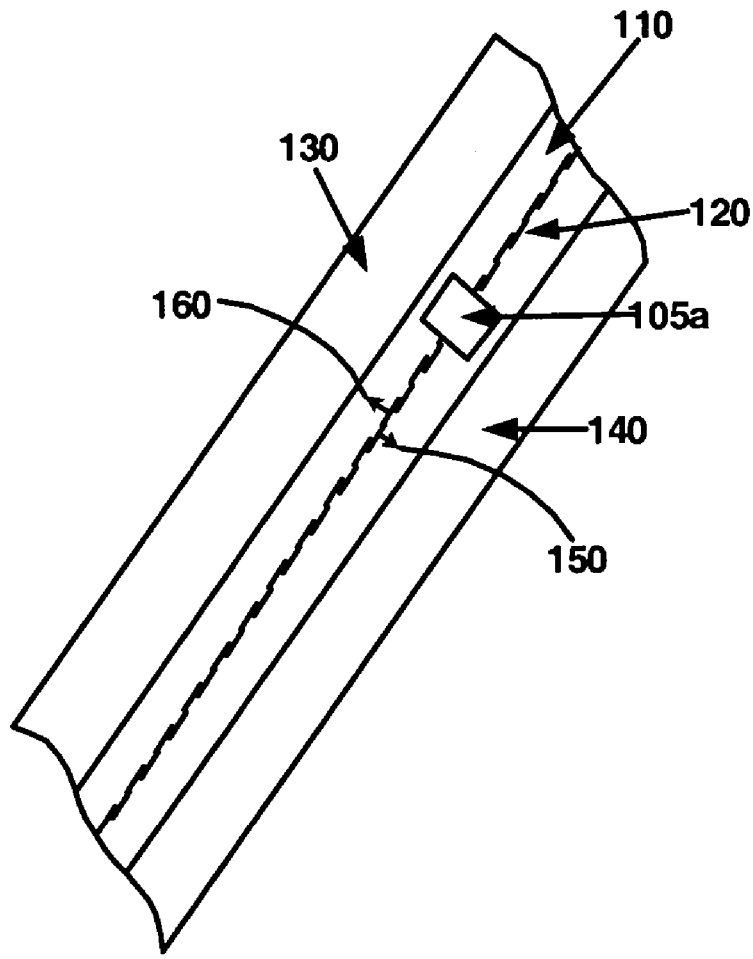
FIGS. 1A, 1B and 1C are illustrations of data tracks showing variations in heads for writing data to the data tracks and the impact of the variations on write inhibit threshold values, according to conventional art.
Figure 1B:
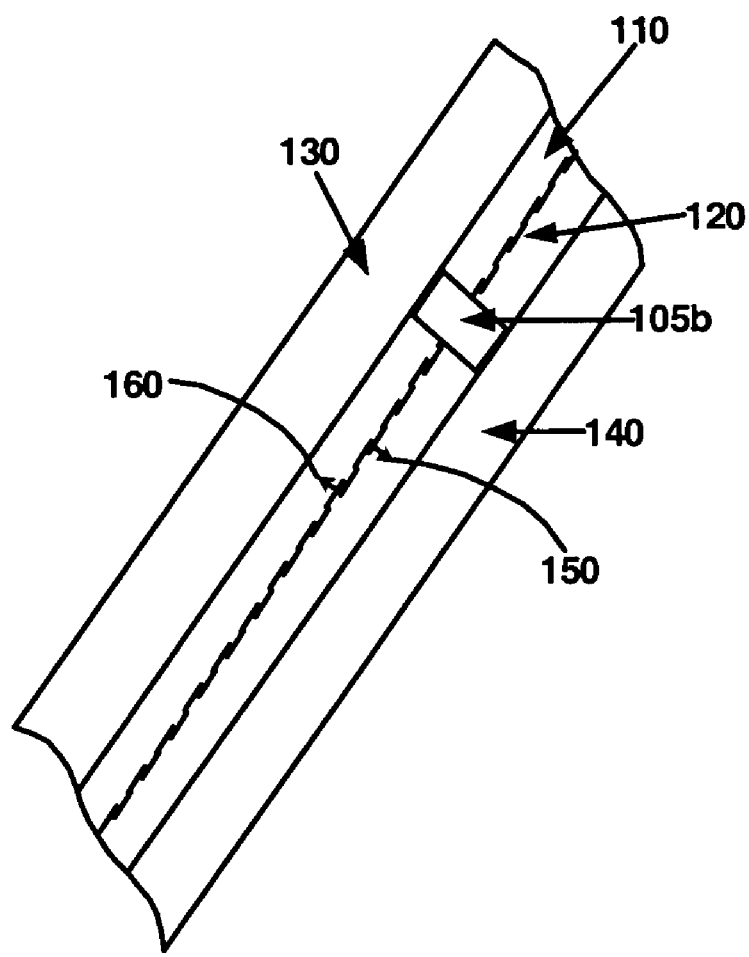
Figure 1C:
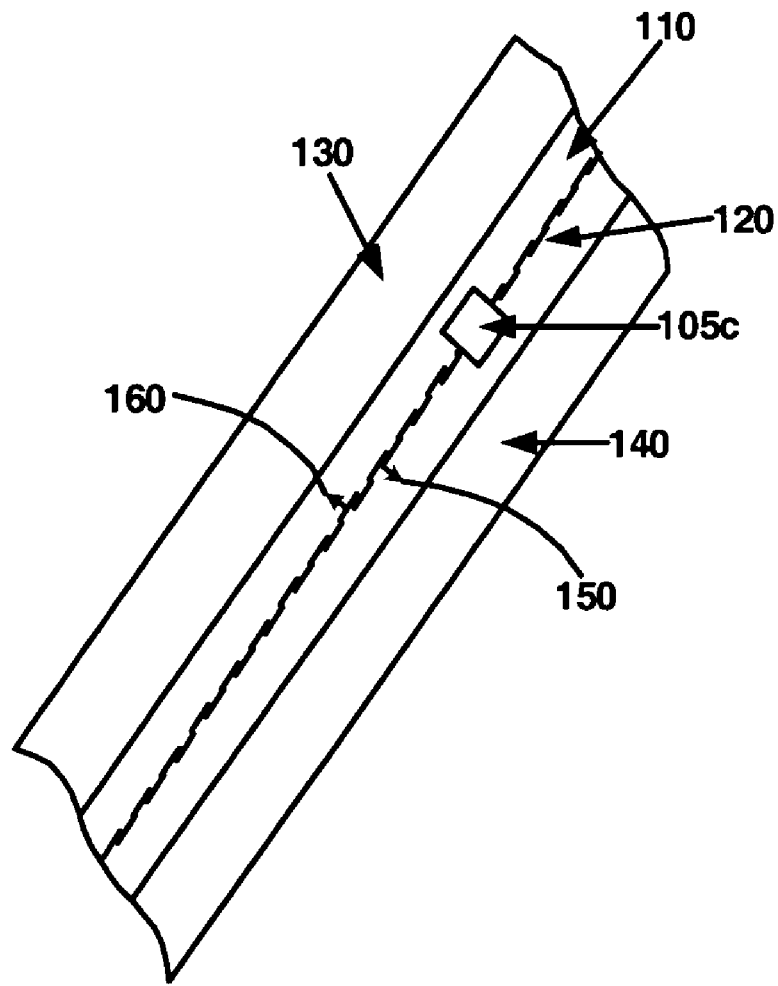
Figure 2:
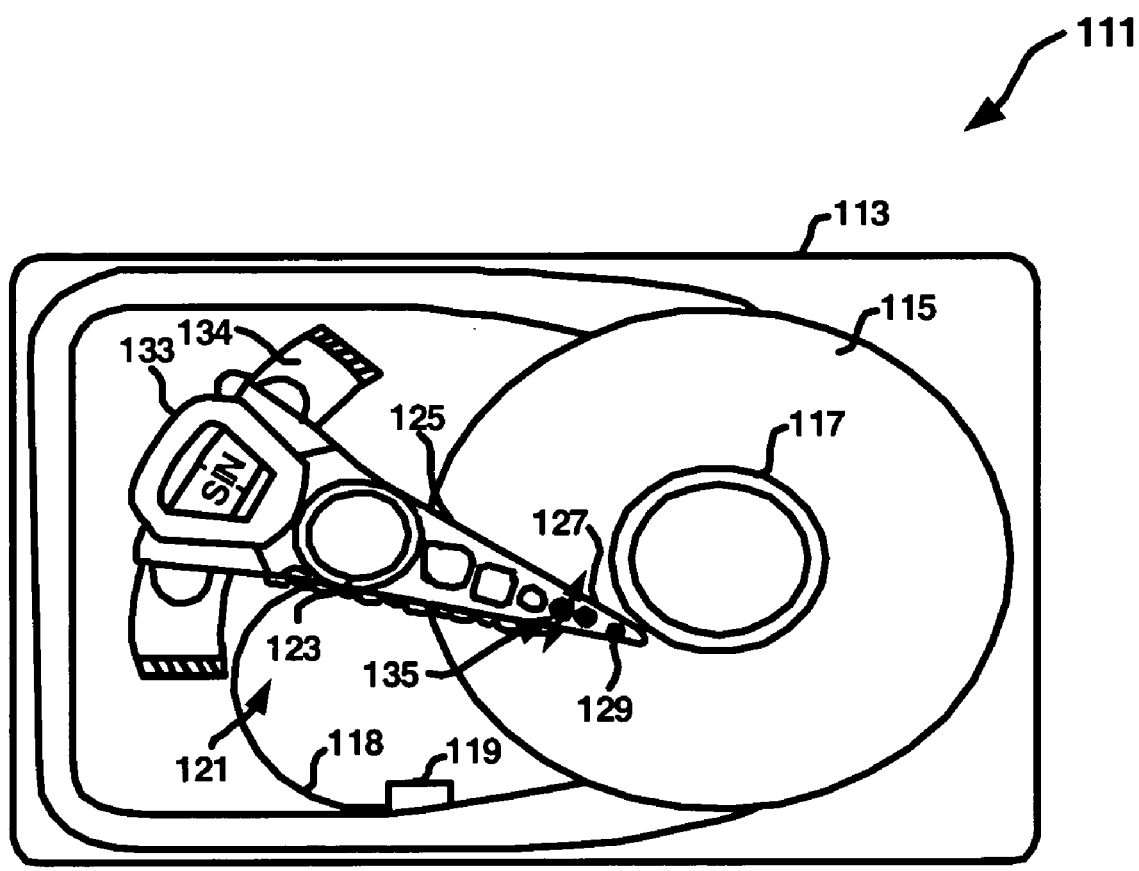
FIG. 2 is a schematic drawing of a magnetic hard disk drive or file for storing data, in accordance with an embodiment of the present invention.

FIG. 2 is a schematic drawing of one embodiment of a magnetic hard disk drive or file 111 for storing data, in accordance with the present invention. File 111 has an outer housing or base 113 containing a disk pack having at least one media or magnetic disk 115. The disk or disks 115 are rotated by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and integrated lead suspension (ILS) 127. A magnetic read/write transducer or head is mounted on a slider 129 and secured to a flexure that is flexibly mounted to each ILS 127. The read/write heads magnetically read data from and/or magnetically write data to disk 115. The level of integration called the head gimbal assembly is the head and the slider 129, which are mounted on suspension 127. The slider 129 is usually bonded to the end of ILS 127.

ILS 127 has a spring-like quality, which biases or presses the air-bearing surface of the slider 129 against the disk 115 to cause the slider 129 to fly at a precise distance from the disk. ILS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless file 111 uses multiple independent actuators (not shown) wherein the arms can move independently of one another.

A file microcode table (not shown) is disposed within file 111, either on a segment of one or more disks, or in a separate storage area, for use by controller 119 for managing said plurality of heads. According to one embodiment, the file microcode table contains at least one write inhibit threshold value that is based on the performance of at least one of the plurality of heads, wherein the at least one write inhibit threshold value is determined during manufacturing of the hard disk drive. In another embodiment, the file microcode table has at least two separate write inhibit threshold values. These at least two separate write inhibit threshold values are based on the performance of one of the plurality of heads, wherein the separate write inhibit thresholds are for at least two of a plurality of zones.

In another embodiment, the file microcode table of FIG. 2 comprises at least two separate write inhibit threshold values, each of which is based on the performance of one of at least two of the plurality of heads. In yet another embodiment, the file microcode table has a plurality of write inhibit threshold values. In this instance, there is at least one write inhibit threshold value assigned to each one of the plurality of heads, and each write inhibit threshold value is based on the performance of the head to which it is assigned.

In yet another embodiment, there may be at least two write inhibit threshold values assigned to each one of the plurality of heads. In this embodiment, each of the at least two write inhibit threshold values is determined for one of at least two of the plurality of zones, each write inhibit threshold value based on the performance of the head to which it is assigned.

In still another embodiment, there may be a plurality of write inhibit threshold values assigned to each one of the plurality of heads, a separate write inhibit threshold value being determined for each of the plurality of zones. In this instance, each of the plurality of write inhibit threshold values is based on the performance of the head to which it is assigned.

FIG. 3 is a flowchart of a method 300 for determining a write inhibit threshold value for at least one head of a file during the file manufacturing process, in accordance with an embodiment of the present invention.

At step 310, according to one embodiment of the present invention, a test track is qualified for use in determining the write inhibit threshold value. This qualification establishes the test track as being suitable for use in determining the write inhibit threshold for a head and for a radial zone on a disk. In one embodiment, the qualification may be performed for a test track in a single zone, or in another embodiment, the qualification may be performed for multiple test tracks one in each of multiple radial zones. Because the quality of a disk may vary across its radius due to, for example, variations in bits per inch and skew, multiple zonal write inhibit threshold values across the radius may be desirable. Other parameters, such as frequency and equalization, are typically measured by radial zones as well. See FIG. 4B for additional details of the test track qualification process.

At step 320, a write inhibit threshold determination process is performed to obtain the write inhibit threshold value. According to one embodiment, the write inhibit threshold determination process is an iterative process that begins by using a nominal value for a write inhibit threshold value, the nominal value determined experimentally, and modifying the value by a safety margin to obtain a track offset value for use in setting the amount of off-track writing to be used for testing the suitability of the track offset value for use as a write inhibit threshold value.

Data is then written off-track by the track offset value on the right and left tracks adjacent to the qualified test track (herein referred to as squeeze-tracks). Multiple writes are performed for a given track offset value. According to one embodiment, the off-track writes are performed using random seeks from positions further out on the disk so as to more closely simulate operational characteristics. A soft error rate (SER) measurement is then performed for the test track and if the SER is determined to be acceptable, the offset value is changed and the process is repeated until the SER is determined to be unacceptable. Once an unacceptable SER value is obtained, the write inhibit threshold is set to the last acceptable offset value for that particular head and, if applicable, for that particular zone.

In one embodiment a unique write inhibit threshold value is determined for one head and for one zone in a file. In another embodiment, multiple write inhibit thresholds are determined for a single head and for multiple zones. In yet another embodiment, a write inhibit threshold value is determined for two or more heads in the file, such that, in a file having multiple heads, each of the heads is not restricted to using the same write inhibit threshold value, or values in the case of multiple zonal values. This process is covered in further detail in FIG. 4B.

At step 330 of FIG. 3, according to one embodiment of the present invention, the write inhibit threshold value is stored for use with the particular head and zone of the file for which it was determined. In another embodiment, when multiple write inhibit threshold values are generated, once the process is completed and all write inhibit threshold values have been determined, they are stored in a file microcode table for use by the file to manage each individual head's unique write inhibit capability during writing operations.

Figure 4A:
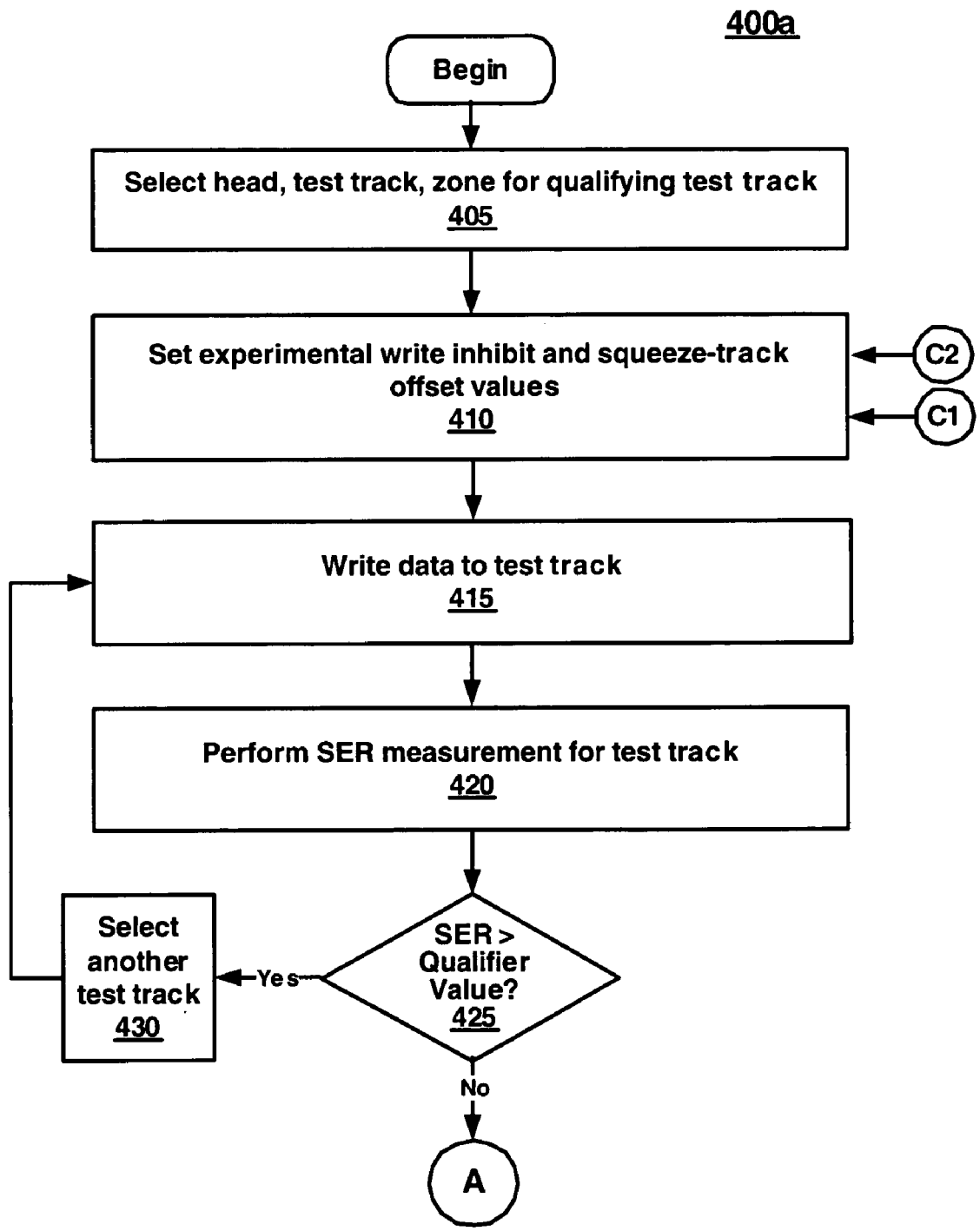
FIG. 4A is a flowchart of a method for qualifying a test track for the determination of a write inhibit threshold value during the file manufacturing process, in accordance with an embodiment of the present invention.

FIG. 4A is a flowchart of a method 400a for qualifying a test track for the determination of a write inhibit threshold value during the file manufacturing process, in accordance with an embodiment of the present invention.

At step 405, according to on embodiment of the present invention, a test track is selected for qualification. The qualification of the test track will determine if it is suitable for us in determining a write inhibit threshold for its associated head and, in the case of multiple zones, for the zone in which it resides.

Figure 4B:
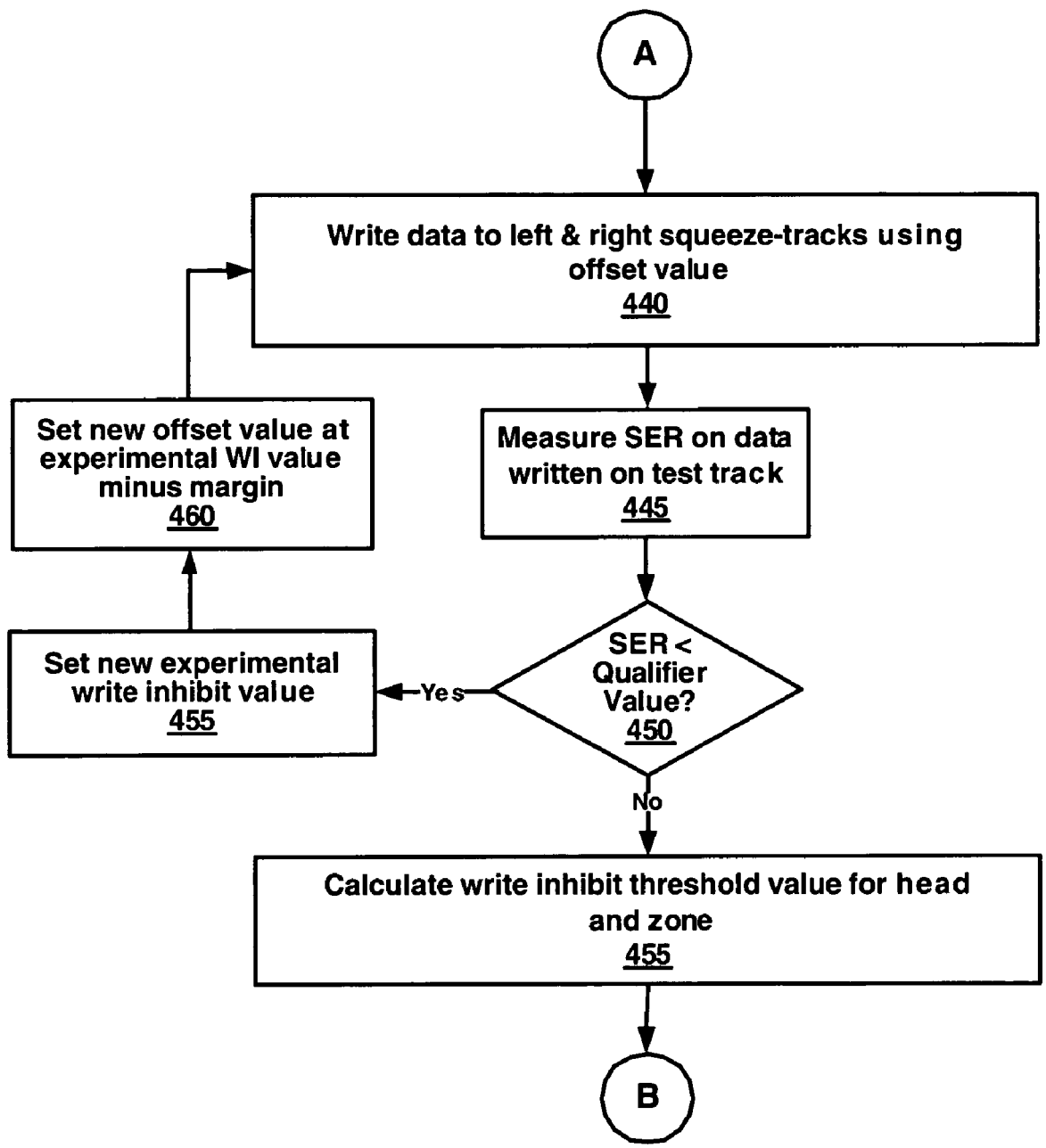
FIG. 4B is a flowchart of a method for performing the determining of a write inhibit threshold value, in accordance with an embodiment of the present invention.

At step 410 of method 400a, according to one embodiment of the present invention, a first experimental write inhibit value and a first experimental track offset value are set, initially, to a default nominal value. This default value may be determined by lab experiments. The track offset value is the amount that data will be written off-track in the determining of a write inhibit threshold value for the head associated with the test track. The determining of a write inhibit threshold value is an iterative process. For subsequent iterations, the offset value is modified, with each iteration, to allow for a more liberal write inhibit threshold value. This iterative process is shown in FIG. 4B.

At step 415 of method 400a, data is written on the selected test track in accordance with one embodiment of the present invention. This data is to be measured during future iterations to determine any impact that writing from adjacent squeeze tracks may have had. Thus it is important to determine that the data, as written initially, has no inherent errors that could be mistaken as being caused by writing from squeeze tracks.

At step 420, according to one embodiment, an SER test is performed on the data written on the selected test track to determine if the selected test track is suitable for use in determining the write inhibit threshold value.

At step 425, the results of the SER test are compared to a predetermined value for passing the test. If the test track fails the SER test, meaning that the first test track is found not to be suitable for use in said determining the write inhibit threshold value, another test track is selected, as shown in step 430, and the process is repeated. If the test track passes the SER test, the process proceeds to the determining of the write inhibit threshold value in FIG. 4B.

Figure 5A:
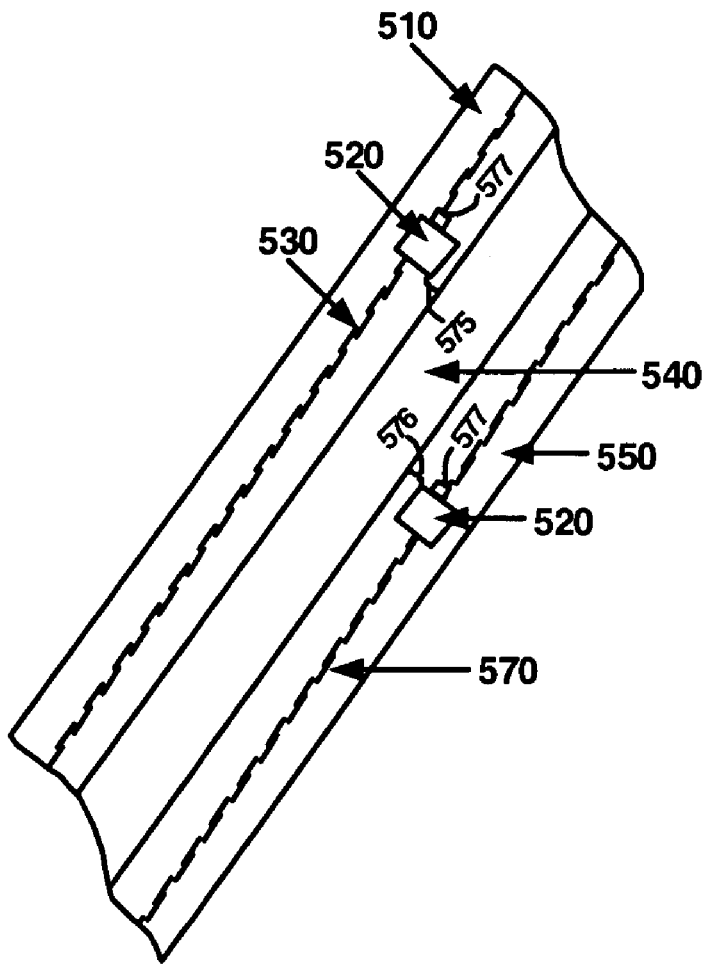
FIGS. 5A, 5B and 5C are top view illustrations of squeeze and test tracks as used in the determination of write inhibit threshold values, in accordance with one embodiment of the present invention.
Figure 5B:
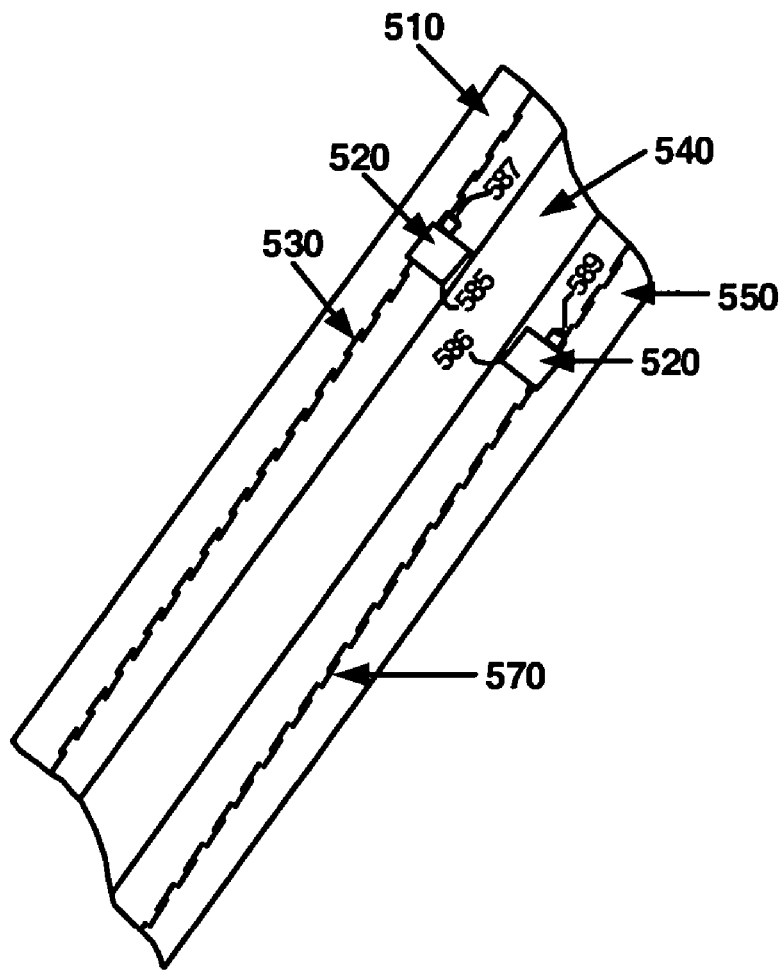
Figure 5C:
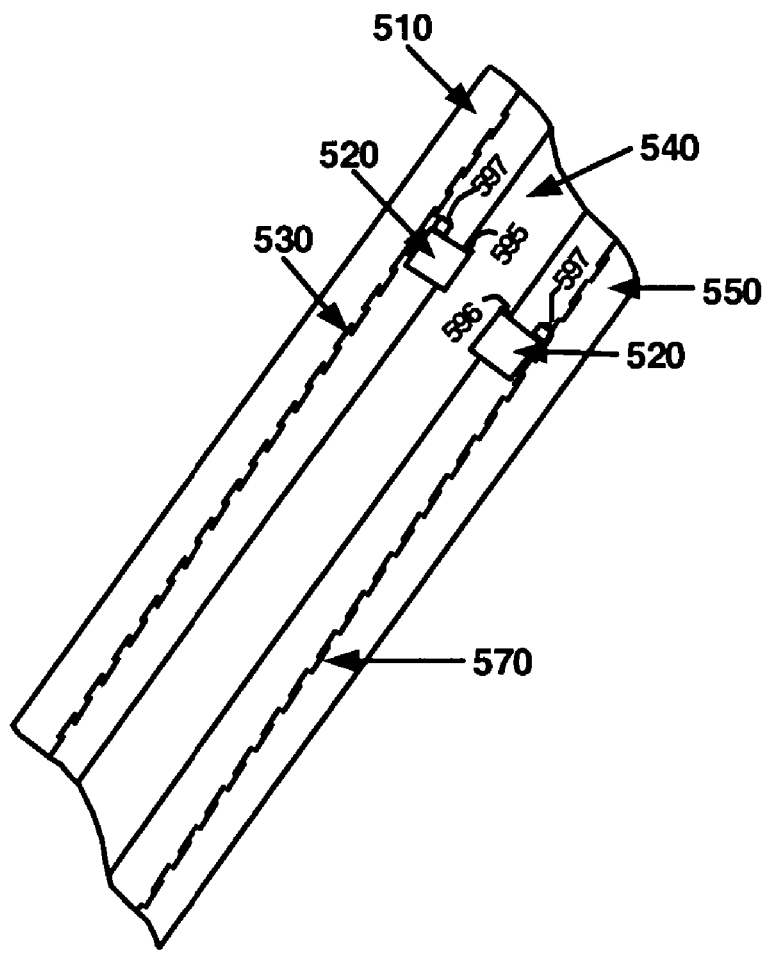

FIG. 4B is a flowchart of a method 400b for performing the determining of a write inhibit threshold value, in accordance with an embodiment of the present invention. Method 400b will be discussed in concert with FIGS. 5A, 5B and 5C. FIGS. 5A, 5B and 5C are top view illustrations of a portion of a disk with a head as used in the determination of write inhibit threshold values, in accordance with embodiments of the present invention. FIGS. 5A, 5B and 5C illustrate a test track 540 having a left squeeze-track 510 and a right squeeze-track 550. Left squeeze-track 510 has a track center 530 and right squeeze-track has a track center 570. Both left squeeze-track 510 and right squeeze-track 550 may be written to by head 520.

At step 440 of method 400b, according to an embodiment of the present invention, upon determining that test track 540 is suitable for use in determining the write inhibit threshold value, data is written on right squeeze-track 550 and left squeeze-track 510 by head 520 using the experimental track offset value, e.g., track offset value 577. Multiple writes are performed for a given track offset value. According to one embodiment, data may be written to the squeeze tracks by directly writing to the squeeze tracks using the track offset value. However, in another embodiment, data may be written to the squeeze tracks using the offset value by multiple random seeks (also known as "butterfly writing" and "butterfly seeks") from some distance away on the disk. By writing with multiple random seeks, operational characteristics may be more closely simulated. In the illustration shown in FIG. 5A, there might be a margin to the test track remaining, such as shown by distance 575 for head 520 on left squeeze-track 510 and distance 576 for head 520 on right squeeze track 550.

At step 445 of method 400b, an SER test is performed on data written on test track 540, in accordance with an embodiment of the present invention. The results of the SER test are then compared to a qualifier value at step 450.

Still referring to FIG. 4B, if the results of the SER test meet the qualification requirements for soft error rates, according to one embodiment, as shown at step 455, a new experimental write inhibit value is calculated. The new experimental write inhibit value would allow for a slightly larger amount of off-track writing, also referred to as a larger amount of "squeeze."

At step 460 of FIG. 4B, a new experimental track offset value is determined based on the new experimental write inhibit value and a margin for safety. This new experimental offset value, such as offset value 587 of FIG. 5B, is then used at step 440 to write data to left squeeze track 510 and right squeeze track 550, and steps 445, 450, 455 and 460 are repeated until the SER test fails to meet the qualification requirement. Referring to FIG. 5B, the new experimental offset value 587 might still provide margin to test track 540, according to one embodiment, as shown by distance 585 for left squeeze track 510 and head 520 and distance 586 for right squeeze track 550 and head 520.

Now, referring to FIG. 5C, experimental offset value 597 is shown to be sufficient to cause head 520 to write onto test track 540 by an amount 595 from left squeeze track 510 and amount 596 from right squeeze track 550. In a case such as this, according to one embodiment, it might be expected that the SER test of step 445 of method 400b would not meet the qualification requirement of step 450. In this case, according to one embodiment, the write inhibit threshold value for head 520, would be calculated by setting it to the last acceptable track offset value. In the present example, according to FIGS. 5A, 5B and 5C, the write inhibit threshold value would be set to track offset value 587. In one embodiment the disk may be divided into radial zones. In the embodiment having radial zones, the write inhibit threshold value is identified for the head and for the zone in which it is determined.

Figure 4C:
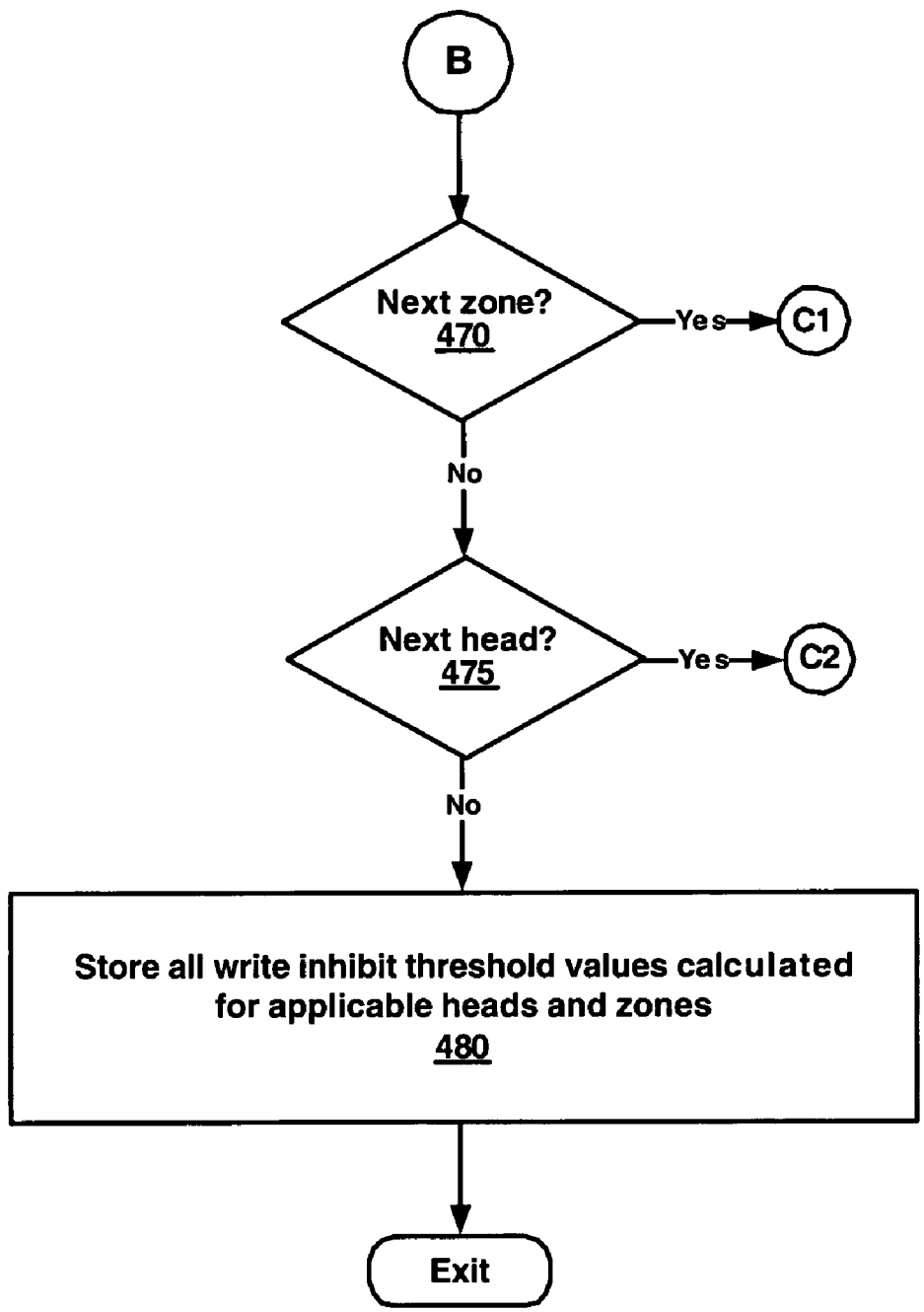
FIG. 4C is a flowchart of a method for calculating and storing write inhibit threshold values for applicable heads and zones, in accordance with an embodiment of the present invention.

FIG. 4C is a flowchart of a method 400c for calculating and storing write inhibit threshold values for applicable heads and zones, in accordance with an embodiment of the present invention.

At step 470 of method 400c, once the write inhibit threshold value has been determined for a head in a particular zone, a check is made to see if there are other zones for which a write inhibit threshold value is to be determined for the present head, according to an embodiment of the present invention. If so, the next zone is selected and method 400c moves to step 410 of FIG. 4A and the process (methods 400a, 400b and 400c) is repeated. This process is repeated until an associated write inhibit threshold value is determined for all of the zones for a given head. Once a write inhibit threshold has been determined for all zones for a particular head, method 400c moves to step 475.

At step 475 of method 400c, a check is made to see if a write inhibit threshold value, or a plurality of write inhibit threshold values is to be determined for another head in the file. If so, the next head is selected and method 400c returns to step 410 of FIG. 4A and the process described by methods 400a, 400b and 400c is repeated for the next head. This process is repeated until there is a unique write inhibit threshold value determined for every applicable head and zone. This method ensures that each of the heads is not restricted to using a single set of zonal write inhibit threshold values, such as might be determined for the most limiting head in the file.

At step 480, once all write inhibit threshold values have been determined, they are stored in a microcode file table in the hard disk file for use by the file to manage each individual head's unique write inhibit capability during writing operations. Method 400c is then exited.

Figure 6:
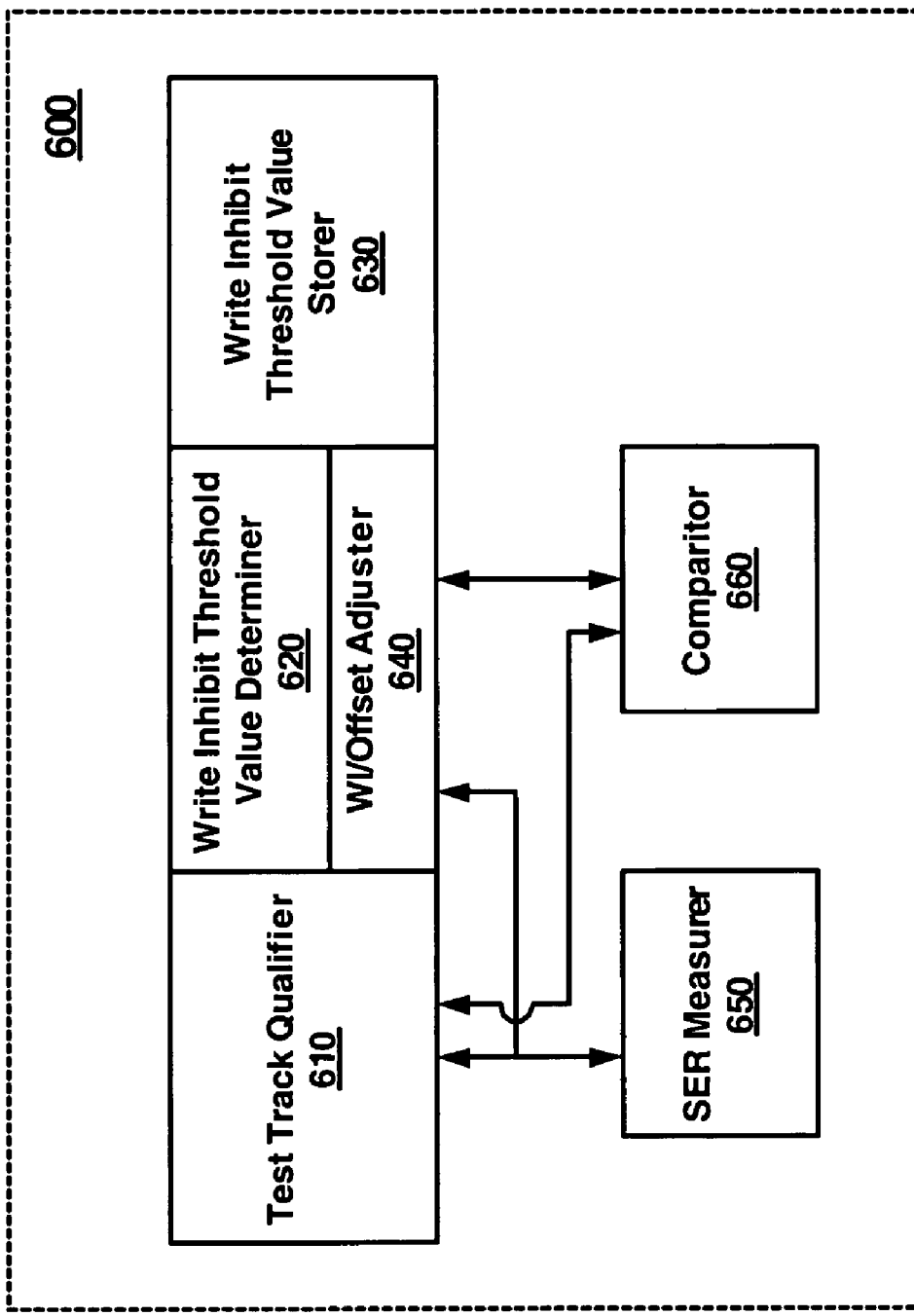
FIG. 6 is a block diagram of a write inhibit threshold value establisher 600, in accordance with one embodiment of the present invention. Write inhibit threshold establisher 600 has a test track qualifier 610 for qualifying a test track as suitable for determining a write inhibit threshold value.

FIG. 6 is a block diagram of a write inhibit threshold value establisher 600, in accordance with one embodiment of the present invention. Write inhibit threshold value establisher 600 has a test track qualifier 610 for qualifying a test track, e.g. test track 540 of FIG. 5, on a disk as suitable for determining write inhibit threshold values during the manufacturing of the hard disk drive. The qualification may be performed for a single head and a single zone, for a single head and a plurality of zones, for a plurality of heads and a single zone, or for a plurality of heads and a plurality of zones. The details of the method performed by test track qualifier 610 are discussed in conjunction with FIG. 4A above.

According to one embodiment, write inhibit threshold value determiner 620 of write inhibit threshold value establisher 600 is coupled to test track qualifier 610, for determining at least one write inhibit threshold value. In one embodiment, write inhibit threshold value determinor 620 includes an experimental write inhibit value adjustor 640 for adjusting experimental write inhibit values and associated experimental track offset values for determining said a write inhibit threshold value. The details of the functions performed by write inhibit threshold value determinor 620 and write inhibit value adjustor 640 are discussed in conjunction with FIG. 4B above.

Write inhibit threshold value establisher 600 also has a write inhibit threshold value storer 630 for storing write inhibit threshold values in a file microcode table, according to one embodiment of the present invention. The details of the functions of write inhibit threshold value storer 630 are discussed with FIG. 4C above.

In addition, write inhibit threshold value establisher 600 includes a soft error rate measurer 650 for measuring the soft error rate for data written on said test track, according to one embodiment. Write inhibit threshold value establisher 600 also includes a comparitor 660 for comparing the results of measuring the soft error rate for data written on a test track to a qualifying value, for determining the suitability of the test track and for determining write inhibit threshold values.

Thus, the present invention provides, in various embodiments, a method for determining unique write inhibit thresholds for individual heads for maximizing file servo performance. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for determining write inhibit threshold values for at least one head of a file during the file manufacturing process, said method comprising:
   qualifying a test track for use in said determining a first write inhibit threshold value for a first radial zone;
   performing a write inhibit threshold determination process to obtain said first write inhibit threshold value;
   storing said first write inhibit threshold value for use with said at least one head of said file; and
   repeating said performing and said storing to determine a second write inhibit threshold value for a second radial zone, wherein said second write inhibit threshold value is associated with the same head that said first write inhibit threshold value is associated with and whereby determining write inhibit threshold values on a per zone basis is enabled.

2. The method as recited in claim 1 wherein said determining said write inhibit threshold value further comprises:
   determining a unique write inhibit threshold value for said at least one head for each of a plurality of zones in said file.

3. The method as recited in claim 2 wherein said determining said unique write inhibit threshold value further comprises:
   determining a separate write inhibit threshold value for said at least one of a plurality of heads in said file, such that in said file having said plurality of heads, each of said heads is not restricted to using a single write inhibit threshold value.

4. The method as recited in claim 1, wherein said qualifying said test track further comprises:
   selecting a first test track;
   setting an experimental write inhibit value and an experimental track offset value to a default value;
   writing data on said first test track;
   performing a soft error rate test on said data written on said first test track to determine if said first test track is suitable for use in said determining said first write inhibit threshold value; and
   when said first test track is found not to be suitable for use in said determining said first write inhibit threshold value, selecting a second test track and performing said qualifying on said second test track.

5. The method as recited in claim 4, wherein said performing said write inhibit threshold value determination process further comprises:
   writing data on a right adjacent track and a left adjacent track using said experimental track offset value;
   performing a soft error rate test on data on said test track; and
   varying said experimental write inhibit threshold value and said experimental track offset value until said soft error rate test produces unacceptable results.

6. The method as recited in claim 5, further comprising:
   upon said soft error rate test producing unacceptable results, setting said first write inhibit threshold value to a last acceptable experimental track offset value.

7. The method as recited in claim 6 wherein said writing data on said right adjacent track and said left adjacent track further comprises:
   using random seeks such that said write inhibit threshold value determination process more closely resembles operational characteristics.

8. The method as recited in claim 6, further comprising:
   repeating said method for each of a plurality of zones in said file to determine a set of zonal write inhibit threshold values, such that each of said plurality of zones has a unique write inhibit threshold value assigned to it.

9. The method as recited in claim 8, further comprising:
   repeating said method for each of a plurality of heads in said file such that, in said file having said plurality of heads, each of said heads is not restricted to using a single set of zonal write inhibit threshold values.

10. The method as recited in claim 9, wherein said storing said write inhibit threshold value further comprises:
    storing said determined write inhibit threshold value for each of said plurality of zones and for each of said plurality of heads in a table for use by said file to manage write inhibit capability.

11. A hard disk drive comprising:
    a housing;
    a disk pack mounted to said housing and having a plurality of disks that are rotatable relative to said housing;
    an actuator mounted to said housing and being movable relative to said disk pack, the actuator having a plurality of heads for reading data from and writing data to said disks;
    a file microcode table disposed within said hard disk drive, said file microcode table for use by said actuator for managing said plurality of heads, wherein said file microcode table comprises two write inhibit threshold values for two different radial zones that are based on the performance of a particular head of said plurality of heads, wherein said two write inhibit threshold values are determined during the manufacturing of said hard disk drive.

12. The hard disk drive as described in claim 11 wherein said file microcode table comprises:
    at least two separate write inhibit threshold values based on the performance of one of said plurality of heads, each one of said at least two separate write inhibit threshold values for one of at least two of a plurality of zones.

13. The hard disk drive as described in claim 11 wherein said file microcode table comprises:
    at least two separate write inhibit threshold values, each one of said at least two separate write inhibit threshold values based on the performance of a separate one of at least two of said plurality of heads.

14. The hard disk drive as described in claim 11 wherein said file microcode table comprises:
    a plurality of write inhibit threshold values, wherein there is at least one write inhibit threshold value assigned to each one of said plurality of heads, and wherein each said at least one write inhibit threshold value is based on the performance of the head to which it is assigned.

15. The hard disk drive as described in claim 14, wherein there are at least two write inhibit threshold values assigned to each one of said plurality of heads, and wherein each of said at least two write inhibit threshold values is determined for one of at least two of a plurality of zones, said at least two write inhibit threshold values based on the performance of the head to which they are assigned.

16. A write inhibit threshold value establisher comprising:
    test track qualifier means for qualifying a test track on a disk for a particular head of a plurality of heads in a hard disk drive as suitable for determining at least two write inhibit threshold values for two different radial zones, said qualifying and said determining performed during the manufacturing of said hard disk drive;

write inhibit threshold value determinor means coupled to said test track qualifier means, said write inhibit threshold value determinor means for said determining said at least two write inhibit threshold values; and write inhibit threshold value storer means coupled to said write inhibit threshold value determinor means, said write inhibit threshold value storer means for storing said at least two write inhibit threshold values in a file microcode table.

17. The write inhibit threshold value establisher of claim 16 further comprising:

soft error rate measurer means coupled to said test track qualifier means and to said write inhibit threshold value determinor means, said soft error rate measurer means for measuring the soft error rate for data written on said test track.

18. The write inhibit threshold value establisher of claim 17 further comprising:

test track comparitor means coupled to said test track qualifier means and to said write inhibit threshold value determinor means, said test track comparitor means for comparing results of said measuring said soft error rate for data written on said test track to a qualifying value, said comparing for determining suitability of said test track and for determining at least one of said write inhibit threshold values.

19. The write inhibit threshold value establisher of claim 18 wherein said write inhibit threshold value determinor means comprises an experimental write inhibit and offset value adjustor means for adjusting an at least one experimental write inhibit value and an associated at least one experimental track offset value for determining said at least one write inhibit threshold value.

20. The write inhibit threshold value establisher of claim 19 wherein said experimental write inhibit and offset value adjustor means is for adjusting a separate said at least one experimental write inhibit value and a separate said associated at least one experimental track offset value for each of said plurality of heads in said hard disk drive for determining a separate said at least one write inhibit threshold value for each of said plurality of heads.

* * * * *